US009734633B2

(12) United States Patent
Bennett et al.

(10) Patent No.: US 9,734,633 B2
(45) Date of Patent: Aug. 15, 2017

(54) VIRTUAL ENVIRONMENT GENERATING SYSTEM

(75) Inventors: Darren Bennett, Seattle, WA (US); Brian Mount, Seattle, WA (US); Stephen Latta, Seattle, WA (US); Alex Kipman, Redmond, WA (US); Ryan Hastings, Seattle, WA (US); Arthur Tomlin, Bellevue, WA (US); Sebastian Sylvan, Seattle, WA (US); Daniel McCulloch, Kirkland, WA (US); Jonathan Steed, Redmond, WA (US); Jason Scott, Kirkland, WA (US); Mathew Lamb, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 351 days.

(21) Appl. No.: 13/360,492

(22) Filed: Jan. 27, 2012

(65) Prior Publication Data
US 2013/0194259 A1  Aug. 1, 2013

(51) Int. Cl.
*G06T 19/00* (2011.01)
*G06K 9/00* (2006.01)

(52) U.S. Cl.
CPC .. *G06T 19/006* (2013.01); *G05B 2219/35503* (2013.01); *G06K 9/00671* (2013.01); *H04M 2203/359* (2013.01)

(58) Field of Classification Search
CPC ......... G06T 17/20; G06T 19/00; G06T 17/00; G06T 17/10; G06T 17/005; G06T 19/006;
(Continued)

(56) References Cited

U.S. PATENT DOCUMENTS 8,493,383 B1 * 7/2013 Cook .................. G06T 15/06
345/419
8,878,749 B1 * 11/2014 Wu .................... G01S 17/06
345/8

(Continued)

FOREIGN PATENT DOCUMENTS

EP        2378488 A2   10/2011
WO    2009094643 A2    7/2009

OTHER PUBLICATIONS

Toshikazu Ohshima, Hiroyuki Yamamoto, and Hideyuki Tamura Media Technology Laboratory, Canon Inc. 890-12, Kashimada, Saiwai-ku, Kawasaki, Kanagawa 211, Japan, "Gaze-Directed Adaptive Rendering for Interacting with Virtual Space", 1996, IEEE, Proceedings of VRAIS '96 , pp. 103-111.*

(Continued)

*Primary Examiner* — Maurice L McDowell, Jr.
(74) *Attorney, Agent, or Firm* — Alleman Hall Creasman & Tuttle LLP

(57) ABSTRACT

A system and related methods for visually augmenting an appearance of a physical environment as seen by a user through a head-mounted display device are provided. In one embodiment, a virtual environment generating program receives eye-tracking information, lighting information, and depth information from the head-mounted display. The program generates a virtual environment that models the physical environment and is based on the lighting information and the distance of a real-world object from the head-mounted display. The program visually augments a virtual object representation in the virtual environment based on the eye-tracking information, and renders the virtual object representation on a transparent display of the head-mounted display device.

16 Claims, 6 Drawing Sheets

(58) Field of Classification Search
CPC . G06T 2207/10024; G06T 2207/20144; G06T 7/004; G06T 11/60; G06T 15/503; G06T 15/60; G06T 2219/024; G06T 7/0042; G06T 13/40; G06T 2210/62; G06T 15/00; G06T 19/20; G05B 2219/32014; G06F 3/011; G06F 3/012; G06F 3/017; G06F 3/0425; G06F 3/013; G06F 17/30873; G06F 3/005; G06F 3/04815; G02B 27/017; G02B 2027/014; G02B 2027/0178; G02B 2027/0118; G02B 2027/0127; G02B 27/0101; G02B 27/0172; G02B 27/225
USPC .................................................. 345/420, 633
See application file for complete search history.

(56) References Cited

U.S. PATENT DOCUMENTS

| | | | | |
|---|---|---|---|---|
| 9,213,185 | B1* | 12/2015 | Starner | G06T 19/006 |
| 2008/0226179 | A1* | 9/2008 | Dohta | A63F 13/00 |
| | | | | 382/232 |
| 2008/0305713 | A1 | 12/2008 | Cortenraad | |
| 2008/0310707 | A1* | 12/2008 | Kansal | G06T 19/006 |
| | | | | 382/154 |
| 2009/0115784 | A1* | 5/2009 | Tomite | G06T 15/60 |
| | | | | 345/426 |
| 2010/0085351 | A1* | 4/2010 | Deb | G06T 15/00 |
| | | | | 345/419 |
| 2010/0103172 | A1 | 4/2010 | Purdy, Sr. | |
| 2010/0177163 | A1 | 7/2010 | Yang et al. | |
| 2010/0182340 | A1* | 7/2010 | Bachelder et al. | 345/633 |
| 2010/0245387 | A1 | 9/2010 | Bachelder et al. | |
| 2010/0295921 | A1 | 11/2010 | Guthrie et al. | |
| 2011/0018903 | A1* | 1/2011 | Lapstun et al. | 345/633 |
| 2011/0075257 | A1* | 3/2011 | Hua | G02B 27/017 |
| | | | | 359/464 |
| 2011/0109880 | A1 | 5/2011 | Nummela | |
| 2012/0200600 | A1* | 8/2012 | Demaine | 345/633 |
| 2012/0229508 | A1* | 9/2012 | Wigdor et al. | 345/633 |
| 2013/0162673 | A1* | 6/2013 | Bohn | 345/633 |

OTHER PUBLICATIONS

Radoslaw Mantiuk, Bartosz Bazyluk, and Anna Tomaszewska, Gaze-Dependent Depth-of-Field Effect Rendering in Virtual Environments, Julu 2011, SGDA 2011, LNCS 6944, pp. 1-12, 2011. © Springer-Verlag Berlin Heidelberg 2011.*

ISA Korea, International Search Report and Written Opinion of PCT/US2013/022810, May 15, 2013, WIPO, 9 pages.

Okumura et al., "Augmented Reality Based on Estimation of Defocusing and Motion Blurring from Captured Images," Proceedings of the 5th IEEE and ACM International Symposium on Mixed and Augmented Reality, IEEE Computer Society, Oct. 2006, 7 pages.

Supan, et al., "Image Based Shadowing in Real-Time Augmented Reality", Retrieved at <<http://www.google.co.in/url?sa=t&rct=j&q=augmented%20reality%20analyze%20lighting%20condition%20shadow&source=web&cd=2&ved=0CCkQFjAB&url=http%3A%2F%2Fciteseerx.ist.psu.edu%2Fviewdoc%2Fdownload%3Fdoi%3D10.1.1.105.3451%26rep%3Drep1%26type%3Dpdf&ei=_i6pToKtLYWrrAeE1fmNDA&usg=AFQjCNGb0ka_EQGToLcCgN-PzTIVpc7bwQ>>, The International Journal of Virtual Reality, 2006, 5(3):1-7.

Bruckner, et al., "Illustrative Context-Preserving Exploration of Volume Data", Retrieved at <<http://ieeexplore.ieee.org/stamp/stamp.jsp?tp=arnumber=1703375>>, IEEE Transactions on Visualization and Computer Graphics, vol. 12, No. 6, Nov.-Dec. 2006, pp. 1559-1569.

Hua, et al., "Correct focus cues in stereoscopic displays improve 3D depth perception", Retrieved at <<http://spie.org/documents/Newsroom/Imported/003109/003109_10.pdf>>, SPIE (Newsroom), Jul. 29, 2010, pp. 3.

* cited by examiner

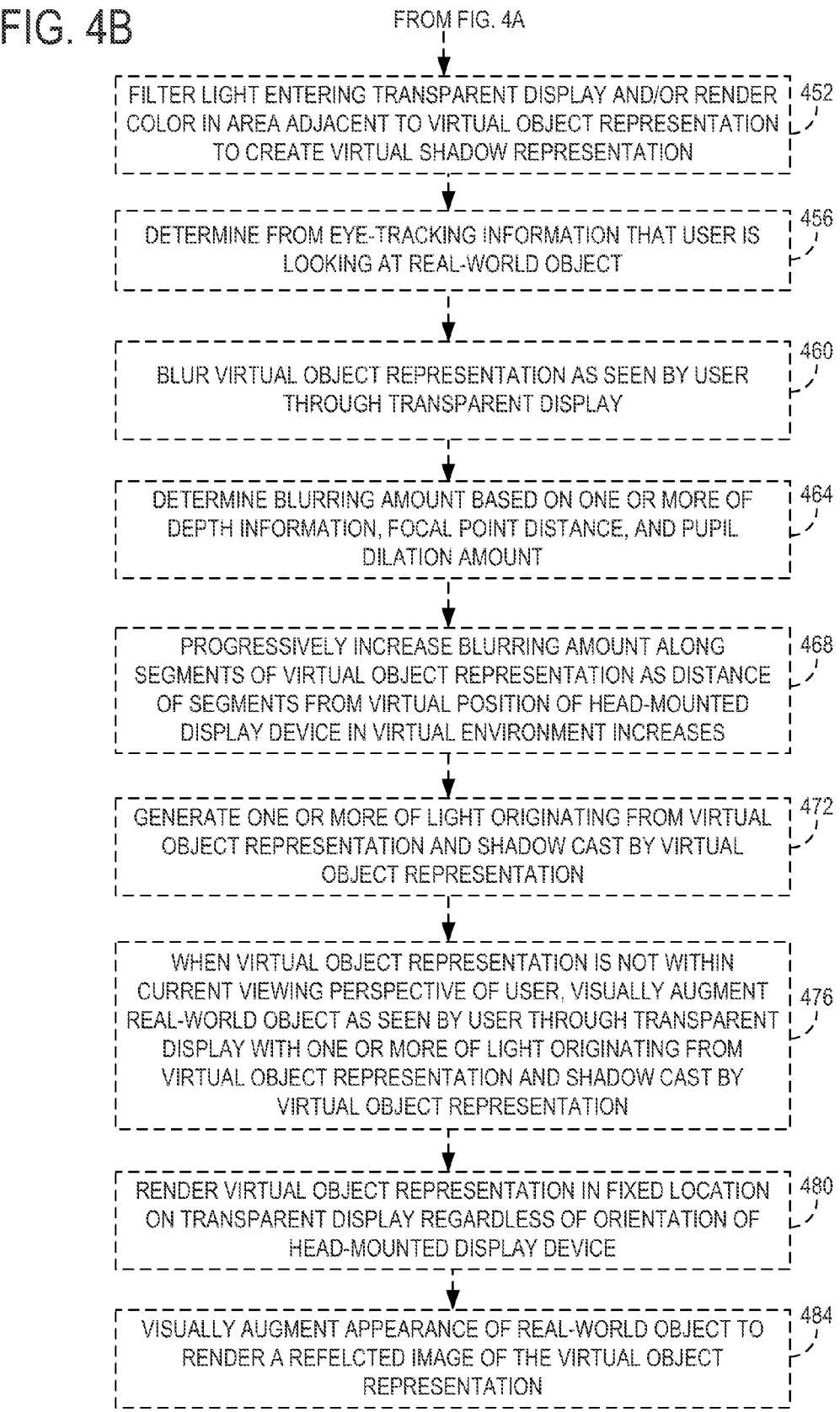

VIRTUAL ENVIRONMENT GENERATING SYSTEM

BACKGROUND

Augmented reality may refer to a view of a physical, real-world environment that is augmented with the addition of virtual content. In one example, a head-mounted display device with a transparent display screen may allow a user to view a real-world environment through the display. One or more virtual objects may be displayed on the transparent display of the head-mounted device in a manner that augments the user's view of the real-world environment to create an augmented reality virtual environment.

Thus far it has proven challenging to provide users with a realistic and believable augmented reality experience. In some cases, virtual content may be perceived as artificial and computer-generated. The virtual content may not appear to be a natural part of the observed real-world environment. For example, real-world lighting and shadow considerations, virtual lighting and shadow effects, depth of field and focus anomalies, and other visual and optical issues may cause a virtual object to appear less than realistic to a user. Additionally, visual issues and incongruities that arise from a less-than-realistic interaction between virtual and real-world objects as seen by the user through the transparent display may be insufficiently addressed.

SUMMARY

To address the above issues, a virtual environment generating system including a head-mounted display device having a transparent display and related methods for visually augmenting an appearance of a physical environment are provided. In one example, a method may include receiving eye-tracking information from an eye-tracking system in the head-mounted display device. Lighting information and depth information, including a distance of a real-world object from the head-mounted display device, may be received from an optical sensor system in the head-mounted display device.

The method may include generating a virtual environment that models the physical environment and is based on the lighting information and the distance of the real-world object from the head-mounted display device. The virtual environment may include a virtual object representation and a real-world object representation. The method may further include visually augmenting the virtual object representation in the virtual environment based on the eye-tracking information. The virtual object representation may be rendered on the transparent display of the head-mounted display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B are a flow chart of a method for augmenting an appearance of a physical environment according to an embodiment of the present disclosure.

DETAILED DESCRIPTION

Figure 1:
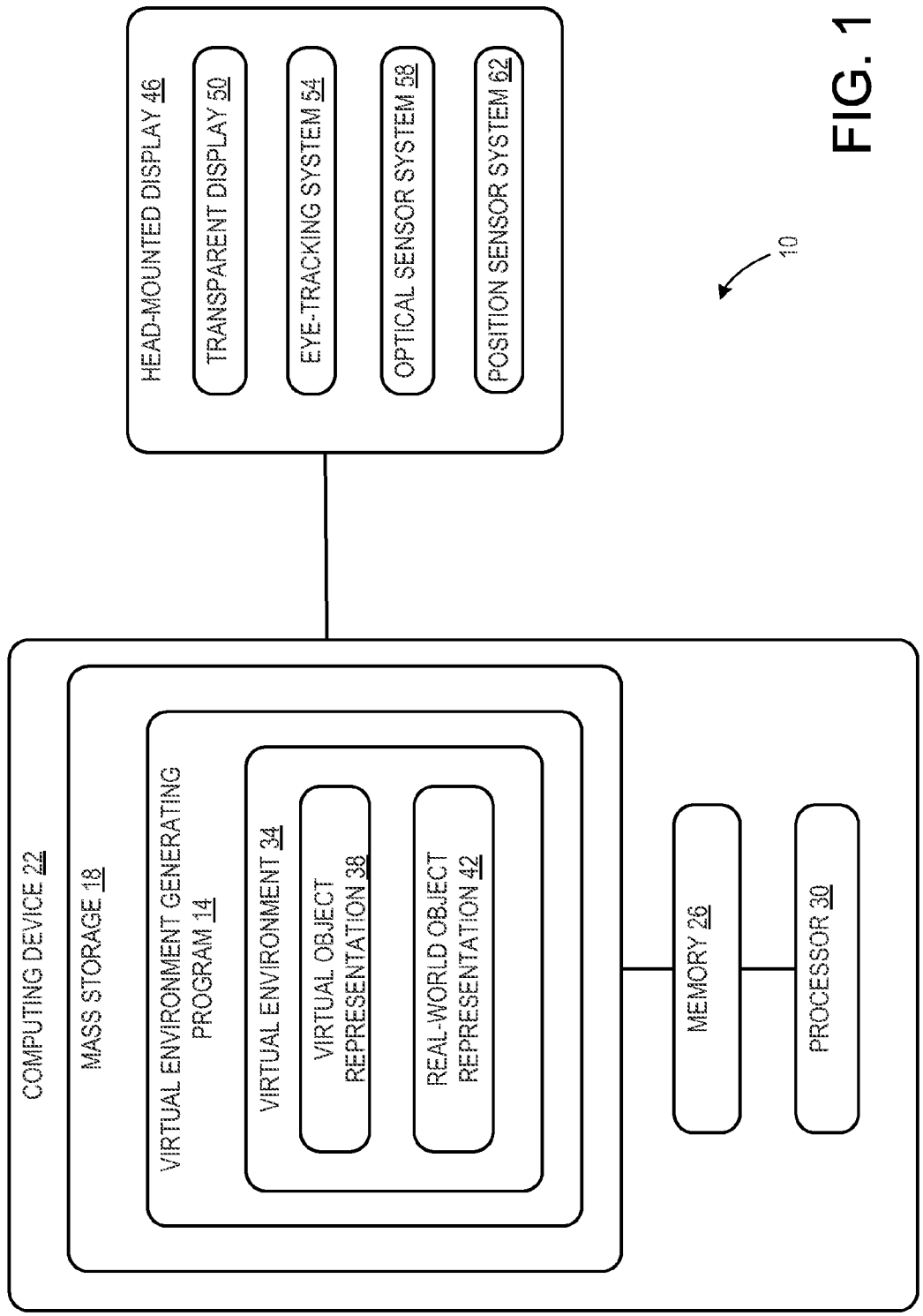
FIG. 1 is a schematic view of a virtual environment generating system according to an embodiment of the present disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included herein are schematic and generally not drawn to scale. Rather, the various drawing scales, aspect ratios, and numbers of components shown in the figures may be purposely distorted to make certain features or relationships easier to see.

FIG. 1 shows a schematic view of one embodiment of a virtual environment generating system 10 for visually augmenting an appearance of a physical environment as seen through a transparent display in a head-mounted display (HMD) device. The virtual environment generating system 10 includes a virtual environment generating program 14 that may be stored in mass storage 18 of a computing device 22. The virtual environment generating program 14 may be loaded into memory 26 and executed by a processor 30 of the computing device 22 to perform one or more of the methods and processes described in more detail below. For example, the virtual environment generating program 14 may generate a virtual environment 34 that includes a virtual object representation 38 and a real-world object representation 42.

The computing device 22 may take the form of a desktop computing device, a mobile computing device such as a laptop, notebook or tablet computer, mobile communications device such as a mobile phone, network computer, home entertainment computer, interactive television, gaming system, or other suitable type of computing device. Additional details regarding the components and computing aspects of the computing device 22 are described in more detail below with reference to FIG. 5.

The computing device 22 may be operatively connected with an HMD device 46 which is described in more detail below. The computing device 22 may utilize a wired connection to the HMD device 46, or may employ a wireless connection via WiFi, Bluetooth, or any other suitable wireless communication protocol. Additionally, the example illustrated in FIG. 1 shows the computing device 22 as a separate component from the HMD device 46. It will be appreciated that in other examples the computing device 22 may be integrated into the HMD device 46.

Figure 2:
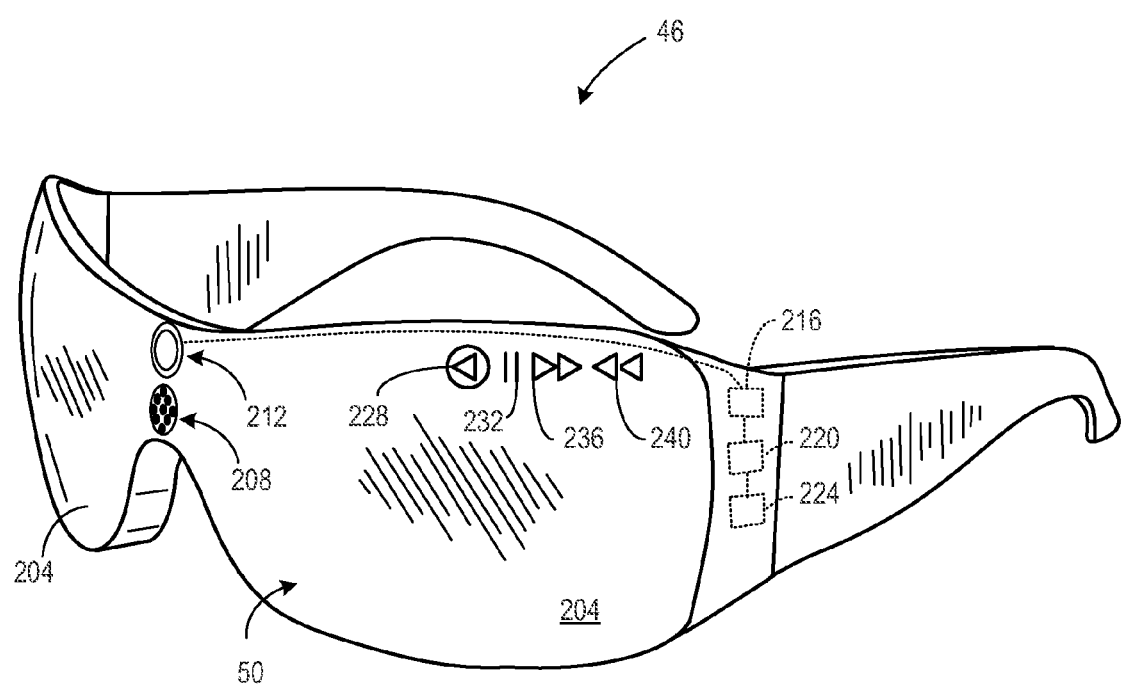
FIG. 2 shows an example head-mounted display device according to an embodiment of the present disclosure.
Figure 3:
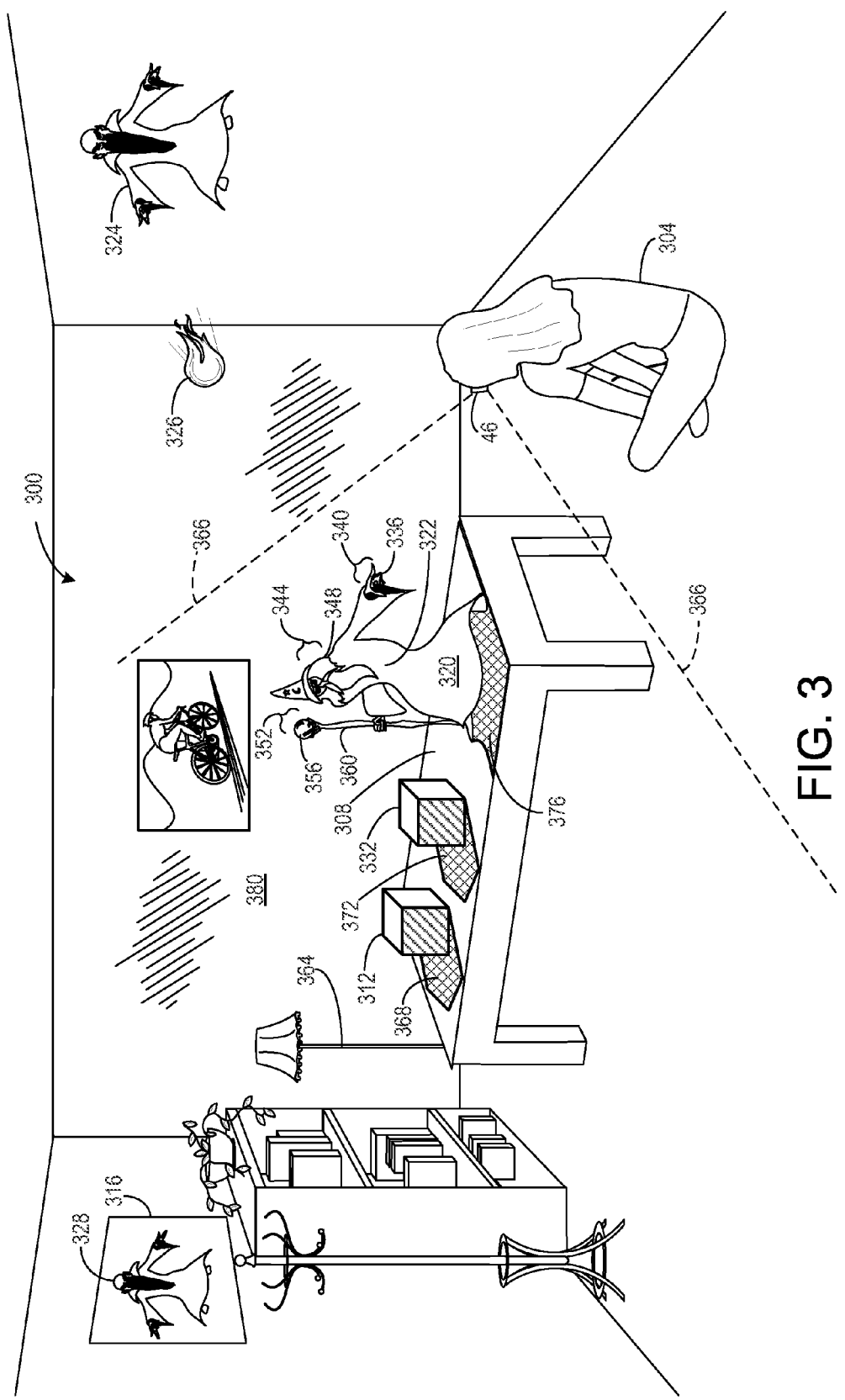
FIG. 3 is a schematic view of a physical environment that shows virtual object representations generated by the virtual environment generating system of FIG. 1 and a user wearing a head-mounted display device.

FIG. 2 shows an example of an HMD device 46 in the form of a pair of wearable glasses, as shown. Additionally and as described in more detail below, FIG. 3 shows a user 304 wearing an HMD device 46. In other examples, the HMD device 46 may take other suitable forms in which a transparent display system is supported in front of a viewer's eye or eyes.

With reference to FIGS. 1 and 2, the HMD device 46 includes a transparent display 50 that enables images to be delivered to the eyes of a user. The transparent display 50 may be configured to visually augment an appearance of a physical environment to a user viewing the physical environment through the transparent display. For example, the appearance of the physical environment may be augmented by graphical content (e.g., one or more pixels each having a respective color and brightness) that is presented via the transparent display 50.

The transparent display 50 may be configured to enable a user to view a real-world object in the physical environment through one or more partially transparent pixels that are displaying a virtual object representation. In one nonlimiting example, the transparent display 50 may include image-producing elements located within lenses 204 (such as, for example, a see-through Organic Light-Emitting Diode (OLED) display). As another example, the transparent display 50 may include a light modulator on an edge of the lenses 204. In this example, the lenses 204 may serve as a light guide for delivering light from the light modulator to the eyes of a user.

In other examples, transparent display 50 may support selective filtering of light received from the physical environment before reaching an eye of a user wearing the HMD device 46. Such filtering may be performed on a pixel-by-pixel basis or on groups of pixels. As one example, the selective filtering or removal of light may be supported by the transparent display 50 at a different resolution (e.g., a lower resolution or a higher resolution) than the resolution supported by the transparent display for the presentation of lighted graphical content (e.g., illuminated pixels). In other examples, transparent display 50 may include a first display layer that adds light in the form of one or more illuminated pixels, and a second display layer that filters light received from the physical environment. These layers may have different display resolution, pixel density, and/or display capabilities.

The HMD device 46 may also include various systems and sensors. For example, the HMD device 46 may include an eye-tracking system 54 that utilizes at least one inward facing sensor 208. The inward facing sensor 208 may be an image sensor that is configured to acquire image data in the form of eye-tracking information from a user's eyes. Using this information, the eye-tracking system 54 may track the position and/or movement of the user's eyes to determine where and/or at what object the user is looking. In one example, the eye-tracking system 54 may determine the vectors at which a user's eyes are pointing. Using this information along with the user's interpupillary distance, an intersection point of the user's gaze in front of the user may be determined. Such intersection point may correspond to a distance for determining the user's focus.

The HMD device 46 may also include an optical sensor system 58 that utilizes at least one outward facing sensor 212, such as an optical sensor. Outward facing sensor 212 may detect lighting information, depth information from real-world objects, user movements such as gesture-based user inputs, etc. For example, outward facing sensor 212 may include a depth camera, a visible light camera, an infrared light camera, or a position tracking camera. In some examples, outward facing sensor 212 may include one or more optical sensors for observing visible spectrum and/or infrared light from the lighting conditions in the physical environment.

It will be appreciated that the optical sensor system 58 may detect lighting information including, but not limited to, ambient light (an overall light value in a room), as well as spot lights, point lights, directional lights in a room, etc. In this manner, color, direction, intensity falloff, and other properties of these lights and light sources may be determined. In other examples, the optical sensor system 58 may include an ambient light sensor which may be used to build a light map of the physical environment.

In other examples, the HMD device 46 may include depth sensing via one or more depth cameras. Time-resolved images from one or more of these depth cameras may be registered to each other and/or to images from another optical sensor such as a visible spectrum camera, and may be combined to yield depth-resolved video.

In some examples, a depth camera may take the form of a structured light depth camera configured to project a structured infrared illumination comprising numerous, discrete features (e.g., lines or points). The depth camera may be configured to image the structured illumination reflected from a scene onto which the structured illumination is projected. A depth map of the scene may be constructed based on spacings between adjacent features in the various regions of an imaged scene.

In other examples, a depth camera may take the form of a time-of-flight depth camera configured to project a pulsed infrared illumination onto a scene. This depth camera may be configured to detect the pulsed illumination reflected from the scene. Two or more of these depth cameras may include electronic shutters synchronized to the pulsed illumination. The integration times for the two or more depth cameras may differ, such that a pixel-resolved time-of-flight of the pulsed illumination, from the source to the scene and then to the depth cameras, is discernable from the relative amounts of light received in corresponding pixels of the two depth cameras. The HMD device 46 may also include an infrared projector to assist in structured light and/or time of flight depth analysis.

Such depth cameras may have a stereo configuration. In these examples, the HMD device 46 may include two depth cameras to observe a physical environment in stereo from two different angles of the user's perspective. In other examples, gesture-based user inputs may also be detected via one or more depth cameras, while in other embodiments gesture-based inputs may not be utilized.

Outward facing sensor 212 may capture images of a physical environment, such as physical environment 300 shown in FIG. 3, which may be provided as input to the virtual environment generating program 14. In one example, the virtual environment generating program may include a 3D modeling system that uses such input to generate virtual environment 34 that models the physical environment that is captured.

The HMD device 46 may also include a position sensor system 62 that utilizes on or more motion sensors 216 to enable position tracking of the HMD device and determine a position of the HMD device within a physical environment. As one example, position sensor system 62 may be configured as a six-axis or six-degree of freedom position sensor system. This example position sensor system may, for example, include three accelerometers and three gyroscopes to indicate or measure a change in location of the HMD device 46 within three-dimensional space along three orthogonal axes (e.g., x, y, z) and a change in an orientation of the HMD device 46 about the three orthogonal axes (e.g., roll, pitch, yaw).

Position sensor system 62 may support other suitable positioning techniques, such as GPS or other global navigation systems. For example, position sensor system 62 may include a wireless receiver (e.g., a GPS receiver or cellular receiver) to receive wireless signals broadcast from satellites and/or terrestrial base stations. These wireless signals may be used to identify a geographic location of the HMD device 46. Positioning information obtained from wireless signals received by the HMD device 46 may be combined with positioning information obtained from other motion sensors, such as accelerometers and/or gyroscopes, to provide an indication of location and/or orientation of the HMD device 46. While specific examples of position sensor systems have been described, it will be appreciated that other suitable position sensor systems may be used.

Motion sensors 216 may also be employed as user input devices, such that a user may interact with the HMD device 46 via gestures of the neck and head, or even of the body. Non-limiting examples of motion sensors include an accelerometer, a gyroscope, a compass, and an orientation sensor, which may be included as any combination or subcombination thereof.

The HMD device 46 may also include one or more microphones 220 to allow the use of voice commands as user inputs. Additionally or alternatively, one or more microphones separate from the HMD device 46 may be used to detect user voice commands. In other examples, audio may be presented to the user via one or more speakers on the HMD device 46, or via another audio output within the physical environment. It will also be understood that the sensors illustrated in FIG. 2 are shown by way of example and thus are not intended to be limiting in any manner, as any other suitable sensors and/or combination of sensors may be utilized.

The HMD device 46 may also include a controller 224 having a logic subsystem and a data-holding subsystem in communication with the various input and output devices of the HMD device, which are discussed in more detail below with respect to FIG. 5. Briefly, the data-holding subsystem may include instructions that are executable by the logic subsystem, for example, to receive and forward inputs from the sensors to computing device 22 (in unprocessed or processed form) via a communications subsystem, and to present images to the user via the transparent display 50.

It will be appreciated that the HMD device 46 described above is provided by way of example, and thus is not meant to be limiting. Therefore it is to be understood that the HMD device 46 may include additional and/or alternative sensors, cameras, microphones, input devices, output devices, etc. than those shown without departing from the scope of this disclosure. Further, the physical configuration of an HMD device 46 and its various sensors and subcomponents may take a variety of different forms without departing from the scope of this disclosure.

With reference now to FIG. 3, this figure provides a schematic view of a physical environment 300 in which a user 304 wearing an HMD device 46 is located. The physical environment 300 may include one or more real-world objects, such as a table 308, real-world block 312 sitting on the table, and mirror 316. FIG. 3 also illustrates virtual object representations that are presented to the user 304 by being displayed on the transparent display 50 of the HMD device 46 worn by the user. In other words, FIG. 3 shows the physical environment 300 as populated with virtual object representations that are positioned in the physical environment according to a virtual environment 34 that is generated by the virtual environment generating program 14.

The virtual environment 34 may model the physical environment 300 and may be based on one or more of user eye-tracking information, lighting information from the physical environment, depth information, image information, and position and/or orientation information of the HMD device 46. In one example, such information may be compiled to generate a virtual environment 34 that comprises a 3D map of the physical environment 300 and includes virtual object representations. Using such a 3D map and selected information received from the HMD device 46, the virtual environment generating program 14 may visually augment one or more of the virtual object representations and/or real-world objects as seen by the user through the transparent display 50 to provide a more realistic and believable augmented reality experience. Additionally, and as discussed in more detail below, the 3D map and selected information may be used to supplement eye-tracking information in determining where and at what object the user 304 is looking, including but not limited to the depth of the object.

In the example illustrated in FIG. 3, the user 304 may be viewing a 3-D movie experience via the HMD device 46. In this example the virtual object representations include a good wizard 320, an evil wizard 324, a fireball 326, a reflected image 328 of the evil wizard 324 in mirror 316, and a virtual block 332 on the table 308. In one example use case, the virtual environment generating program 14 may determine from eye-tracking information received from the HMD device 46 that the user 304 is looking at the real-world block 312. Accordingly, given this information, the virtual environment generating program 14 may generate focal cues for the user 304 that create more realistic visual relationships among the real-world block 312, the good wizard 320, other virtual object representations in the virtual environment 34, and other real-world objects as seen by the user through the transparent display 50.

In this example, as the virtual object representation of the good wizard 320 is closer to the user's eyes than the real-world block 312, the virtual environment generating program 14 may blur the image of the good wizard 320 as seen by the user 304 through the transparent display 50. Additionally, any other virtual object representation on which the user 304 is not focusing may receive blurring appropriate to its distance from where the user's eyes are focusing, and appropriate for the user's eye dilation as discussed below. In this manner, a realistic simulation of retinal image blur may be created to provide an appropriate focal cue to the user 304 with respect to the good wizard 320. In one example, a Gaussian function may be utilized to blur the appearance of the good wizard 320. It will also be appreciated that any other suitable blurring function may also be utilized. In other examples, one or more virtual object representations may be blurred to enhance the visibility of other objects with no connection to position or other real-time data.

In another example, the transparent display 50 may have one or more adjustable focal planes or focal points. In this example, a focal plane or focal point of the transparent display 50 may be selected to coincide with the virtual position of the left hand 336 of the good wizard 320 in the 3D map of the virtual environment 34. As the user 304 is focusing on the left hand 336 of the good wizard 320, the left hand 336 may be rendered as a crisply focused image as perceived by the user 304 through the transparent display 50.

The virtual environment generating program 14 may also determine a blurring amount to be applied to the good wizard 320 based on one or more of depth information, focal point distance and a pupil dilation amount of the user's pupils. For example, where the user 304 is looking at the real-world block 312, a depth camera in the optical sensor system 58 may determine a distance from the good wizard 320 to the user's eyes. This distance may be compared to the distance from the selected focal point at the real-world block 312 to the HMD device 46, and the difference determined. It will be appreciated that an amount of blurring may increase as the distance from the real-world block 312 to the HMD device 46 increases, and/or the difference between the good wizard distance and the real-world block distance increases.

Further, the blurring amount may also be based on an amount of pupil dilation in the eyes of the user 304. To provide proper visual cues to the user 304, as a dilation of the user's pupils increases, objects spaced from the current focal point will appear increasingly blurred. An amount of pupil dilation may be determined, for example, by image information received by the eye-tracking system 54. In this manner, the blurring amount to be applied to the good wizard 320 may also be based on an amount of pupil dilation in the eyes of the user 304.

In another example, the amount of blurring applied to the virtual object representation of the good wizard 320 may increase progressively along one or more segments of the image as a distance of the segments from the HMD device 46 in the virtual environment 34 increases. For example, the virtual object representation of the good wizard 320 may include a first image segment 340 that includes the wizard's outstretched left hand 336, a second image segment 344 that includes a portion of the wizard's hair 348, and a third image segment 352 that includes the crystal globe 356 located at the top of the wizard's staff 360. Where the user 304 is focusing on the wizard's outstretched left hand 336 in the first image segment 340, the amount of blurring applied to the left portion of the wizard's hair 348 in the second image segment 344 may be less than an amount of blurring applied to the crystal globe 356 in the third image segment 352.

It will be appreciated that an amount of blurring may also be customized for each of the virtual object representations as seen by the user 304 through the transparent display 50. In this manner, a more realistic display of the virtual object representations that is based on such objects' current distance from the HMD device 46 may be provided. It will also be appreciated that such blurring amounts may be adjusted in a real-time manner as the user 304 moves her head, shifts her current viewing perspective 366, and/or otherwise changes her position in the physical environment 300.

Additionally, it will be appreciated that the user 304 may change her focus to other virtual object representations or to other real-world objects in the physical environment 300. To maintain realistic visual cues, the virtual environment generating program 14 may adjust a blurring amount applied to one or more virtual object representations at a speed that approximates an actual time needed for the user's eyes to change focus. In one example, in response to the user 304 changing her focus, the blurring amount applied to one or more virtual object representations may be adjusted within approximately 1-2 seconds.

In one example use case, the virtual environment generating program 14 may determine from eye-tracking information received from the HMD device 46 that the user 304 is looking at the virtual block 332. In another example use case, the virtual environment generating program 14 may use depth information received from the HMD device 46 to determine that the user 304 is looking at the virtual block 332. The depth information may include, for example, depth information corresponding to a hand of the user 304 with an outstretched index finger that is pointing at the virtual block 332. Using this depth information, the virtual environment generating program 14 may determine that the user 304 is looking at the real-world block 312.

As noted above, the virtual environment generating program 14 may also receive lighting information from the physical environment 300 that may include light emitted from real-world light sources, such as the lamp 364. The virtual environment 34 may also include the virtual fireball 326 cast by the evil wizard 324, with the virtual fireball emitting an intense virtual light. As shown in FIG. 3, in this example the virtual fireball 326 and the evil wizard 324 are positioned out of the current viewing perspective 366 of the user 304. It will also be appreciated that if the user 304 turns in the direction of the virtual fireball 326 and the evil wizard 324, these virtual object representations would be rendered on the transparent display 50 and visually depicted to the user in their corresponding positions in the virtual environment 34.

Accordingly, the virtual environment generating program 14 may receive at least the lighting information, position information regarding the virtual fireball 326 and the other real-world objects and virtual object representations, and information regarding the intense virtual light emitted from the virtual fireball. Using such information, the virtual environment generating program 14 may render one or more virtual shadow representations on the transparent display 50 that may be created by the light from the virtual fireball interacting with other real-world objects and virtual object representations. Advantageously, the one or more virtual shadow representations may create appropriate visual cues that realistically portray the effects that the intensely bright virtual fireball 326 may have on real-world objects in the physical environment 300 and on virtual object representations in the virtual environment 34. In this manner, the one or more virtual shadow representations may be rendered in areas that are adjacent to one or more virtual object representations and/or real-world objects that are within the current viewing perspective 366 of the user 304. It will be appreciated that any real-world objects and virtual object representations that are within the current viewing perspective 366 of the user 304 may receive real-world and/or virtual lighting adjustments.

As shown in FIG. 3, in this example a first virtual shadow representation 368 may be located adjacent to the real-world block 312 on the table 308, a second virtual shadow representation 372 may be located adjacent to the virtual block 332 on the table 308, and a third virtual shadow representation 376 may be located adjacent to the good wizard 320 on the table 308. The color, brightness, and/or other visual qualities of the first virtual shadow representation 368, second virtual shadow representation 372 and third virtual shadow representation 376 may be adjusted to provide a realistic depiction of the lighting effects created by the virtual fireball 326, even when the virtual position of the virtual fireball is outside the current viewing perspective 366 of the user 304.

With reference to the third virtual shadow representation 376, in one example a bright white color corresponding to light emitted by the virtual fireball 326 may be rendered on top of the table 308. In the area of the table 308 covered by the third virtual shadow representation 376, darker patches may be rendered into the rendered white to create the appearance of a shadow through the rendered contrast.

It will be appreciated that other lighting effects may be generated and rendered on the transparent display to create other visual cues that may naturally follow from the light emitted from the virtual fireball 326. In one example, such light may cause the good wizard's staff 360 to cast a virtual shadow on the virtual block 332. In another example, the overall brightness of the good wizard 320, the virtual block 332, and other real-world objects and virtual object representations within the current viewing perspective 366 of the user 304 may increase as the virtual fireball 326 moves closer to the good wizard.

It will also be appreciated that a virtual shadow representation corresponding to a real-world light source may be added to a virtual object. In one example, a first virtual object may receive light from a real-world light source. If a second virtual object or a real-world object passes between the first virtual object and the light source, a virtual shadow representation corresponding to the second virtual object or the real-world object may be added to the first virtual object.

It will also be appreciated that any suitable display techniques for visually augmenting the appearance as seen through the transparent display 50 of the physical environment 300 and the real-world objects and the virtual object representations may be used. In one example, the transparent display 50 may be capable of selectively reducing and/or filtering an amount of light that is transmitted through portions of the display. In this example, an amount of light transmitted through the transparent display 50 may be selectively reduced and/or filtered in an area corresponding to a virtual shadow. In this manner, the virtual shadow will appear darker than the surrounding area.

In one example, where the surface of the table 308 is a bright color such as white, the first virtual shadow representation 368, second virtual shadow representation 372, and third virtual shadow representation 376 may be created by filtering light received by the transparent display 50 in areas corresponding to each of the virtual shadow representations. In addition, a complimentary color, such as a dark red, may be rendered on top of each shadowed area to provide a more realistic appearance of a shadow on the table.

In another example, a virtual shadow may be rendered by omitting or reducing the illumination of one or more pixels in an area of the transparent display 50 that corresponds to the virtual shadow. In another example, the illumination of one or more pixels may be increased in an area surrounding the virtual shadow to make the virtual shadow appear darker than the surrounding area.

In another example, the virtual environment generating program 14 may determine from eye-tracking information that the user 304 is looking at the robe 322 of the good wizard 320. The robe 322 may have a bright coloring, such as white. A wall 380 having a dark coloring, such as black, may be located immediately behind the good wizard 320 in the line of sight of the user 304. With a transparent display 50 that uses an additive color display technique, the brightly colored virtual robe 322 may tend to appear somewhat transparent to the user 304 when viewed in front of the real-world black wall 380.

In this example, using lighting, depth, and position information, the virtual environment generating program 14 may analyze the contrast pattern of the wall 380 behind the robe 322 of the good wizard 320 and adjust one or more of a color and a brightness of the robe to enhance the contrast of the robe with respect to the contrast pattern of the wall. In this manner, the robe 322 may appear to the user 304 as more solid and realistic.

In another use case example, the appearance of a real-world object that is in the current viewing perspective 366 of the user 304 may be visually augmented with virtual light generated and/or reflected by a virtual object representation that is not within the user's current viewing perspective. With reference to FIG. 3, the real-world mirror 316 may be within the current viewing perspective 366 of the user 304. While the evil wizard 324 is not within the user's current viewing perspective 366, the evil wizard's position relative to the user 304 and the mirror 316 would create a reflection of the evil wizard in the mirror that the user could see. Accordingly, the virtual environment generating program 14 may visually augment the appearance of the real-world mirror 316 in the transparent display 50 to render a reflected image 328 of the evil wizard 324 that is visible to the user through the display.

In another example, a virtual object representation may occlude all or a portion of another virtual object representation and/or a real-world object as seen by the user 304 through the transparent display 50. In one example, the virtual representation of the good wizard 320 may occlude from the view of the user 304 a portion of the virtual block 332 and the entirety of the real-world lamp 364 that are both positioned behind the good wizard. In another example, the 3D movie experience may be interactive. In this example, when the user 304 reaches her hand toward the good wizard 320, her hand may occlude a portion of the wizard that would naturally be blocked from view. The virtual representation of the good wizard 320 may be rendered on the transparent display 50 accordingly, with an appropriate portion of the wizard "blocked" from the user's view by the user's hand. In another example, a transparent real-world object, such as a glass table, may not occlude a virtual object that is behind the transparent real-world object.

In another example, the virtual environment generating program 14 may render one or more virtual object representations in a fixed location on the transparent display 50 regardless of a location or orientation of the HMD device 46. In this manner, such virtual object representations may appear to the user 304 to move in coordination with movement of the user's head and the HMD device 46.

With reference to FIG. 2, in one example one or more playback control indicators, such as play 228, pause 232, fast forward 236, and rewind 240, may be rendered in a fixed location on the transparent display 50. In this manner, regardless of the orientation of the HMD device 46 or the user's head, the playback control indicators will appear to the user 304 in the same location relative to the transparent display 50. In one example, the playback control indicators may be rendered to float approximately 10 inches in front of the transparent display 50. The playback control indicators may also be interactive, such that the user 304 may "touch" one of the indicators to control playback of a movie, program or other media experience.

In another use case example, the user 304 may desire to purchase a new piece of furniture for the room shown in the physical environment 300 of FIG. 3. For example, the user 304 may visit an on-line furniture retailer and locate a couch that is of interest. The virtual environment generating program 14 may include a virtual representation of the couch in the virtual environment 34, and may display the virtual couch in one or more potential locations in the room. If desired, the virtual environment generating program 14 may "remove" one or more real-world objects from the user's view and place the virtual couch in the location occupied by the real-world object. Advantageously, the user 304 may observe the virtual couch in a variety of locations in the room, which may also include realistic lighting effects applied to the couch and based on actual lighting conditions in the room.

In other examples, other visual distortions corresponding to other phenomena may be applied to virtual object representations. In one example, a real-world fireplace may generate a heat field. A virtual object representation may be located behind the heat field. The optical sensor system 58 of the HMD device 46 may detect the heat field, and a visual distortion corresponding to the heat field may be applied to the virtual object. In another example, a real-world prism or beveled glass may receive virtual light, and a visual distortion corresponding to refraction of the light may be applied to the virtual light exiting the prism or glass.

Figure 4A:
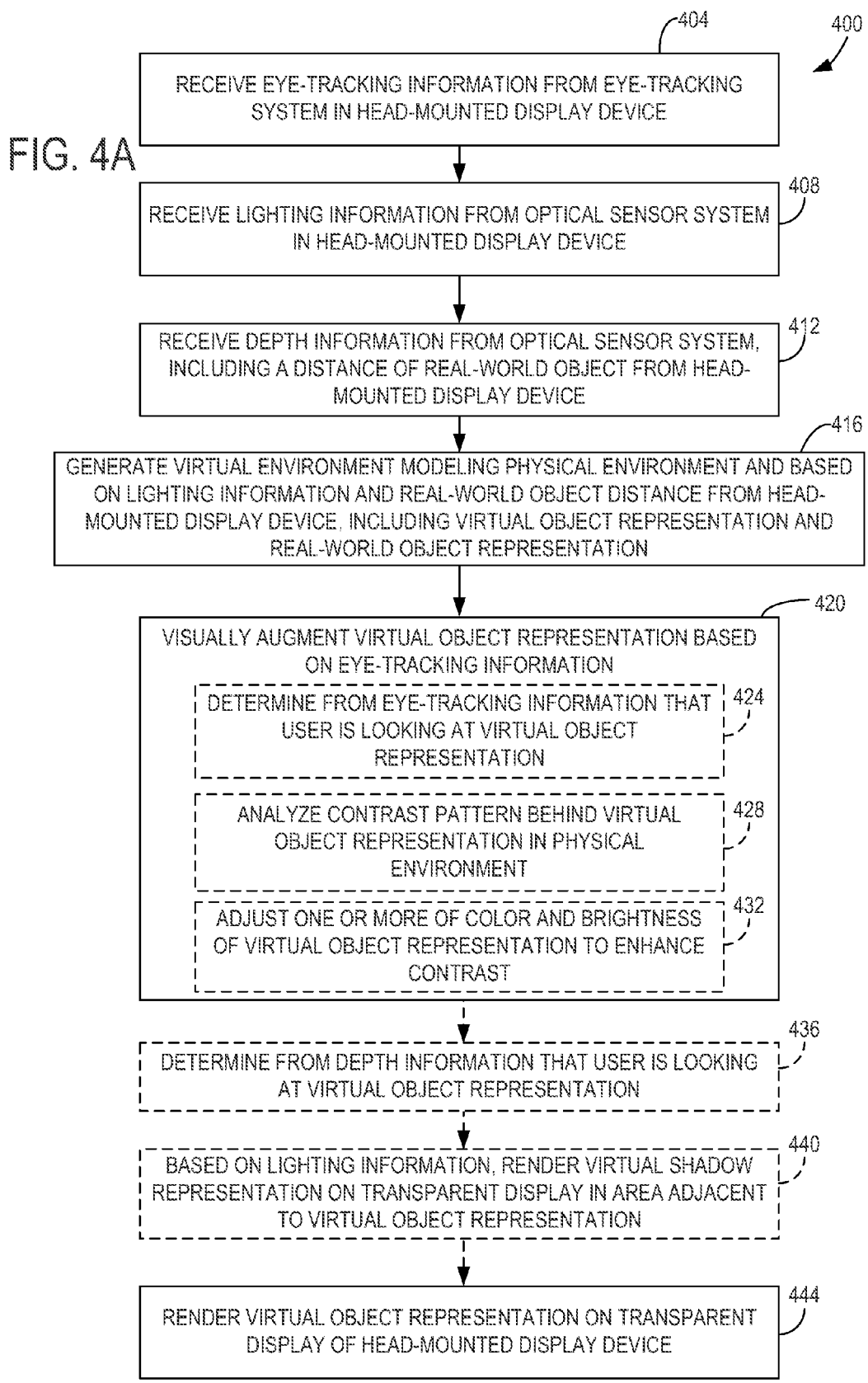

FIGS. 4A and 4B illustrate a flow chart of a method 400 for visually augmenting an appearance of a physical environment including a real-world object as seen by a user through a transparent display in a head-mounted display device, according to an embodiment of the present disclosure. The following description of method 400 is provided with reference to the software and hardware components of the virtual environment generating system 10 described above and shown in FIGS. 1-3. It will be appreciated that method 400 may also be performed in other contexts using other suitable hardware and software components.

With reference to FIG. 4A, at 404 the method 400 may include receiving eye-tracking information from the eye-tracking system 54 in the HMD device 46. At 408 the method 400 may include receiving lighting information from an optical sensor system 58 in the HMD device 46. At 412 the method 400 may include receiving depth information from the optical sensor system 58, with the depth information including a distance of a real-world object from the HMD device 46.

At 416, the method 400 may include generating a virtual environment 34 that models a physical environment 300 in which the user is located. The virtual environment 34 may be based on the lighting information and the distance of the real-world object from the HMD device 46, with the virtual environment including a virtual object representation 38 and a real-world object representation 42. At 420 the method 400 may include visually augmenting the virtual object representation 38 in the virtual environment 34 based on the eye-tracking information.

In one example, at 424 the method 400 may include determining from the eye-tracking information that the user is looking at the virtual object representation. At 428 the method 400 may include analyzing a contrast pattern behind the virtual object representation in the physical environment. At 432 the method 400 may include adjusting one or more of a color and a brightness of the virtual object representation 38 to enhance the contrast of the virtual object representation with respect to the contrast pattern. In another example, at 436 the method 400 may include determining from the depth information that the user is looking at the virtual object representation. At 440, and based on the lighting information, the method 400 may include creating a virtual shadow representation on the transparent display 50 in an area adjacent to the virtual object representation.

At 444 the method 400 may include rendering the virtual object representation on the transparent display 50 of the HMD device 46. With reference now to FIG. 4B, in one example and at 452 the method 400 may include creating the virtual shadow representation by filtering light that enters the transparent display 50 from the physical environment and/or rendering color in the area adjacent to the virtual object representation 38.

At 456 the method 400 may include determining from the eye-tracking information that the user 304 is looking at the real-world object. At 460 the method 400 may include blurring the virtual object representation 38 as seen by the user 304 through the transparent display 50. At 464 the method 400 may also include determining a blurring amount based on one or more of the depth information, a focal point distance, and a pupil dilation amount. At 468 the method 400 may further include progressively increasing the blurring amount along segments of the virtual object representation as a distance of the segments from a virtual position of the head-mounted display device in the virtual environment increases.

At 472 the method 400 may include generating one or more of a light originating from the virtual object representation and a shadow cast by the virtual object representation. At 476 the method 400 may include, when the virtual object representation 38 is not within a current viewing perspective 366 of the user 304, visually augmenting the real-world object as seen by the user through the transparent display 50 with one or more of light originating from the virtual object representation and the shadow cast by the virtual object representation. At 480, the method may further include rendering the virtual object representation 38 in a fixed location on the transparent display 50 regardless of an orientation of the HMD device 46. At 484, the method 400 may additionally include visually augmenting an appearance of the real-world object to render a reflected image of the virtual object representation.

Figure 5:
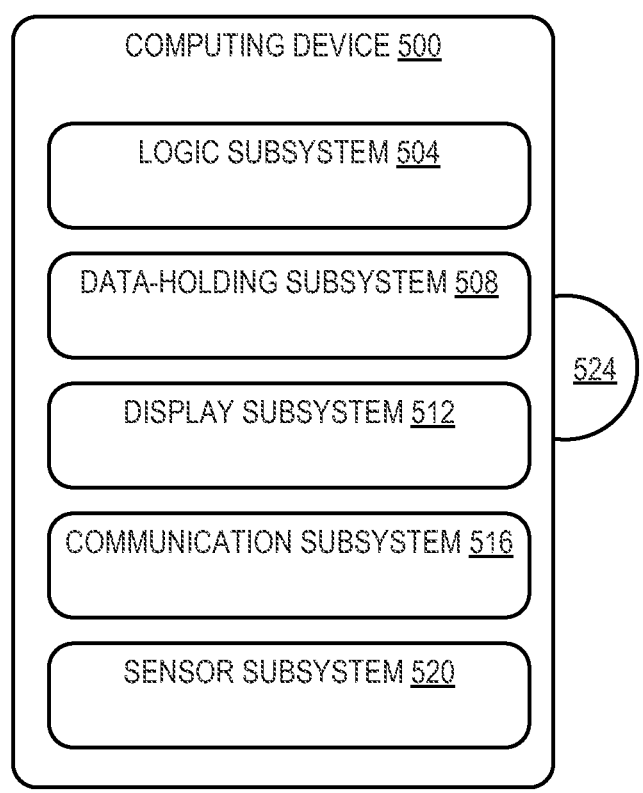
FIG. 5 is a simplified schematic illustration of an embodiment of a computing device.

FIG. 5 schematically shows a nonlimiting embodiment of a computing device 500 that may perform one or more of the above described methods and processes. Computing device 500 is shown in simplified form. It is to be understood that virtually any computer architecture may be used without departing from the scope of this disclosure. In different embodiments, computing device 500 may take the form of a mainframe computer, server computer, desktop computer, laptop computer, tablet computer, home entertainment computer, network computing device, mobile computing device, mobile communication device, gaming device, etc.

As shown in FIG. 5, computing device 500 includes a logic subsystem 504, a data-holding subsystem 508, a display subsystem 512, a communication subsystem 516, and a sensor subsystem 520. Computing device 500 may optionally include other subsystems and components not shown in FIG. 5. Computing device 500 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 504 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 504 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 508 may include one or more physical, non-transitory devices configured to hold data and/or instructions executable by the logic subsystem 504 to implement the herein described methods and processes. When such methods and processes are implemented, the state of data-holding subsystem 508 may be transformed (e.g., to hold different data).

Data-holding subsystem 508 may include removable media and/or built-in devices. Data-holding subsystem 508 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 508 may include devices with one or more of the following characteristics: volatile, nonvolatile, dynamic, static, read/write, read-only, random access, sequential access, location addressable, file addressable, and content addressable. In some embodiments, logic subsystem 504 and data-holding subsystem 508 may be integrated into one or more common devices, such as an application specific integrated circuit or a system on a chip.

FIG. 5 also shows an aspect of the data-holding subsystem 508 in the form of removable computer-readable storage media 524, which may be used to store and/or transfer data and/or instructions executable to implement the methods and processes described herein. Removable computer-readable storage media 524 may take the form of CDs, DVDs, HD-DVDs, Blu-Ray Discs, EEPROMs, and/or floppy disks, among others.

It is to be appreciated that data-holding subsystem 508 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 512 may be used to present a visual representation of data held by data-holding subsystem 508. Display subsystem 512 may include, for example, the transparent display 50 of the HMD device 46. As the above described methods and processes change the data held by the data-holding subsystem 508, and thus transform the state of the data-holding subsystem, the state of the display subsystem 512 may likewise be transformed to visually represent changes in the underlying data. The display subsystem 512 may include one or more display devices utilizing virtually any type of technology. Such display devices may be combined with logic subsystem 504 and/or data-holding subsystem 508 in a shared enclosure, or such display devices may be peripheral display devices.

Communication subsystem 516 may be configured to communicatively couple computing device 500 with one or more networks and/or one or more other computing devices. Communication subsystem 516 may include wired and/or wireless communication devices compatible with one or more different communication protocols. As nonlimiting examples, the communication subsystem 516 may be configured for communication via a wireless telephone network, a wireless local area network, a wired local area network, a wireless wide area network, a wired wide area network, etc.

In some embodiments, the communication subsystem may allow computing device 500 to send and/or receive messages to and/or from other devices via a network such as the Internet.

Sensor subsystem 520 may include one or more sensors configured to sense different physical phenomenon (e.g., visible light, infrared light, acceleration, orientation, position, etc.) as described above. For example, the sensor subsystem 520 may comprise one or more eye-tracking sensors, image sensors, motion sensors such as accelerometers, touch pads, touch screens, and/or any other suitable sensors. Sensor subsystem 520 may be configured to provide observation information to logic subsystem 504, for example. As described above, observation information such as eye-tracking information, lighting information, depth information, position information, motion information, and/or any other suitable sensor data may be used to perform the methods and processes described above.

In some embodiments, sensor subsystem 520 may include a depth camera (e.g., outward facing sensor 212 of FIG. 2). The depth camera may include left and right cameras of a stereoscopic vision system, for example. Time-resolved images from both cameras may be registered to each other and combined to yield depth-resolved video.

In other embodiments, the depth camera may be a structured light depth camera configured to project a structured infrared illumination comprising numerous, discrete features (e.g., lines or dots). The depth camera may be configured to image the structured illumination reflected from a scene onto which the structured illumination is projected. Based on the spacings between adjacent features in the various regions of the imaged scene, a depth image of the scene may be constructed.

In other embodiments, the depth camera may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination. The integration times for the cameras may differ, such that a pixel-resolved time-of-flight of the pulsed illumination, from the source to the scene and then to the cameras, is discernable from the relative amounts of light received in corresponding pixels of the two cameras.

In some embodiments, sensor subsystem 520 may include a visible light camera, such as a digital camera. Virtually any type of digital camera technology may be used without departing from the scope of this disclosure. As a non-limiting example, the visible light camera may include a charge coupled device image sensor.

The term "program" may be used to describe an aspect of the virtual environment generating system 10 that is implemented to perform one or more particular functions. In some cases, such a program may be instantiated via logic subsystem 504 executing instructions held by data-holding subsystem 508. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for visually augmenting an appearance of a physical environment including a real-world object as seen by a user through a transparent display in a head-mounted display device, comprising:
   receiving eye-tracking information from an eye-tracking system in the head-mounted display device;
   determining from the eye-tracking information that the user is looking at a virtual object representation;
   receiving lighting information from an optical sensor system in the head-mounted display device;
   receiving depth information from the optical sensor system, the depth information including a distance of the real-world object from the head-mounted display device;
   generating a virtual environment that models the physical environment and is based on the lighting information and the distance of the real-world object from the head-mounted display device, the virtual environment including the virtual object representation and a real-world object representation;
   visually augmenting the virtual object representation in the virtual environment based on the eye-tracking information that the user is looking at the virtual object representation;
   rendering the virtual object representation on the transparent display of the head-mounted display device;
   determining from the eye-tracking information that the user is looking at the real-world object;
   based on determining that the user is looking at the real-world object, blurring the virtual object representation as seen by the user through the transparent display;
   analyzing a contrast pattern behind the virtual object representation in the physical environment; and
   adjusting one or more of a color and a brightness of the virtual object representation to enhance contrast of the virtual object representation with respect to the contrast pattern.

2. The method of claim 1, further comprising:
   based on the lighting information, rendering a virtual shadow representation on the transparent display in an area adjacent to the virtual object representation.

3. The method of claim 2, wherein rendering the virtual shadow representation further comprises filtering light that enters the transparent display from the physical environment and/or rendering color in the area adjacent to the virtual object representation.

4. The method of claim 1, further comprising:
   determining from the depth information that the user is looking at the virtual object representation; and
   based on the lighting information, rendering a virtual shadow representation on the transparent display in an area adjacent to the virtual object representation.

5. The method of claim 1, further comprising visually augmenting an appearance of the real-world object to render a reflected image of the virtual object representation.

6. The method of claim 1, further comprising:
   determining a blurring amount based on one or more of the depth information, a focal point distance, and a pupil dilation amount.

7. The method of claim 6, further comprising progressively increasing the blurring amount along segments of the virtual object representation as a distance of the segments from a virtual position of the head-mounted display device in the virtual environment increases.

8. The method of claim 1, further comprising:
   generating one or more of a light originating from the virtual object representation and a shadow cast by the virtual object representation; and
   when the virtual object representation is not within a current viewing perspective of the user, visually augmenting the real-world object as seen by the user through the transparent display with the one or more of the light originating from the virtual object representation and the shadow cast by the virtual object representation.

9. The method of claim 1, further comprising:
   rendering the virtual object representation in a fixed location on the transparent display regardless of an orientation of the head-mounted display device.

10. A virtual environment generating system including a head-mounted display device operatively connected to a computing device, the head-mounted display device including a transparent display through which a user may view a physical environment that includes a real-world object, the virtual environment generating system comprising:
    a virtual environment generating program executed by a processor of the computing device, the virtual environment generating program configured to:
      receive eye-tracking information from an eye-tracking system in the head-mounted display device;
      determine from the eye-tracking information that the user is looking at a virtual object representation;
      receive lighting information from an optical sensor system in the head-mounted display device;
      receive depth information from the optical sensor system, the depth information including a distance of the real-world object from the head-mounted display device;
      generate a virtual environment that models the physical environment and is based on the lighting information and the distance of the real-world object from the head-mounted display device, the virtual environment including the virtual object representation and a real-world object representation;
      visually augment the virtual object representation in the virtual environment based on the eye-tracking information that the user is looking at the virtual object representation;
      render the virtual object representation on the transparent display of the head-mounted display device;
      determine from the eye-tracking information that the user is looking at the real-world object;
      based on determining that the user is looking at the real-world object, blur the virtual object representation as seen by the user through the transparent display;
    analyze a contrast pattern behind the virtual object representation in the physical environment; and adjust one or more of a color and a brightness of the virtual object representation to enhance contrast of the virtual object representation with respect to the contrast pattern.

11. The virtual environment generating system of claim 10, wherein the virtual environment generating program is further configured to visually augment an appearance of the real-world object to render a reflected image of the virtual object representation.

12. The virtual environment generating system of claim 10, wherein the virtual environment generating program is further configured to determine a blurring amount based on one or more of the depth information, a focal point distance, and a pupil dilation amount.

13. The virtual environment generating system of claim 12, wherein the virtual environment generating program is further configured to progressively increase the blurring amount along segments of the virtual object representation as a distance of the segments from a virtual position of the head-mounted display device in the virtual environment increases.

14. The virtual environment generating system of claim 10, wherein the virtual environment generating program is further configured to:
generate one or more of a light originating from the virtual object representation and a shadow cast by the virtual object representation; and
when the virtual object representation is not within a current viewing perspective of the user, visually augment the real-world object as seen by the user through the transparent display with the one or more of the light originating from the virtual object representation and the shadow cast by the virtual object representation.

15. A nonvolatile computer-readable storage medium comprising instructions stored thereon and executable by a computing device to visually augment an appearance of a physical environment including a real-world object as seen by a user through a transparent display in a head-mounted display device, the instructions being executable to:
receive eye-tracking information from an eye-tracking system in the head-mounted display device;
receive lighting information from an optical sensor system in the head-mounted display device;
receive depth information from the optical sensor system, the depth information including a distance of the real-world object from the head-mounted display device;
generate a virtual environment that models the physical environment and is based on the lighting information and the distance of the real-world object from the head-mounted display device, the virtual environment including a virtual object representation and a real-world object representation;
determine from the eye-tracking information that the user is looking at the real-world object;
based on the eye-tracking information that the user is looking at the real-world object, blur an appearance of the virtual object representation as seen by the user through the transparent display;
analyze a contrast pattern behind the virtual object representation in the physical environment;
adjust one or more of a color and a brightness of the virtual object representation to enhance contrast of the virtual object representation with respect to the contrast pattern; and
render the virtual object representation on the transparent display of the head-mounted display device.

16. The nonvolatile computer-readable storage medium of claim 15, wherein the instructions are executable by the computing device to:
determine a blurring amount based on one or more of the depth information, a focal point distance, and a pupil dilation amount.

* * * * *